US007555917B2

(12) United States Patent
Brady, Jr. et al.

(10) Patent No.: US 7,555,917 B2
(45) Date of Patent: Jul. 7, 2009

(54) PROCESS FOR PURIFICATION OF ANHYDROUS HYDROGEN CHLORIDE GAS

(75) Inventors: Bill L. Brady, Jr., Duesseldorf (DE); Guenther Weymans, Kuerten-Bechen (DE); Berthold Keggenhoff, Krefeld (DE); Friedhelm Steffens, Leverkusen (DE)

(73) Assignees: Bayer MaterialScience LLC, Pittsburgh, PA (US); Bayer MaterialScience AG, Leverkusen (DE)

( * ) Notice: Subject to any disclaimer, the term of this patent is extended or adjusted under 35 U.S.C. 154(b) by 1063 days.

(21) Appl. No.: 10/787,608

(22) Filed: Feb. 26, 2004

(65) Prior Publication Data

US 2004/0163411 A1    Aug. 26, 2004

Related U.S. Application Data

(62) Division of application No. 10/124,795, filed on Apr. 17, 2002, now Pat. No. 6,719,957.

(51) Int. Cl.
*F25J 3/00* (2006.01)
(52) U.S. Cl. ....................................................... 62/617
(58) Field of Classification Search .................... 62/617
See application file for complete search history.

(56) References Cited

U.S. PATENT DOCUMENTS

| | | | | | |
|---|---|---|---|---|---|
| 3,260,059 | A | * | 7/1966 | Rosenberg et al. | 62/623 |
| 3,374,637 | A | * | 3/1968 | Wenzke | 62/617 |
| 3,541,802 | A | * | 11/1970 | Swearingen | 62/619 |
| 3,815,376 | A | * | 6/1974 | Lofredo et al. | 62/639 |
| 4,010,017 | A |   | 3/1977 | Loyless | 62/28 |
| 4,444,016 | A | * | 4/1984 | Banerjee | 62/617 |
| 4,528,174 | A |   | 7/1985 | Schmidhammer et al. | 423/488 |
| 4,839,153 | A | * | 6/1989 | Schmidhammer et al. | 423/488 |
| 4,935,220 | A |   | 6/1990 | Schneider et al. | 423/488 |
| 4,986,975 | A |   | 1/1991 | Schmidhammer et al. | 423/488 |
| 5,126,119 | A |   | 6/1992 | Freyer et al. | 423/240 R |
| 5,231,836 | A | * | 8/1993 | Saari | 62/617 |

OTHER PUBLICATIONS

G. Oertel, Polyurethane Handbook, (Carl Hanser Verlag, Munich) (month unavailable) 1985, p. 66, Phosgenation processes.

* cited by examiner

*Primary Examiner*—William C Doerrler
(74) *Attorney, Agent, or Firm*—Lyndanne M. Whalen; Noland J. Cheung

(57) ABSTRACT

High boiling contaminants such as chloro-aromatic compounds are removed from a gas by compressing the gas containing the contaminant, cooling the compressed gas to reduce the temperature of the gas to at least 20° C. above the outlet temperature of a second cooling stage but above the freezing point of the highest melting compound in the first cooling stage, further cooling the gas in a second cooling stage to at least −20° C., returning cooled gas from the second cooling stage to the first cooling stage, and recovering condensate streams which contain the contaminant compound from the first and second cooling stages. An apparatus suitable for carrying out this process is also disclosed. The process of the present invention is particularly useful for removing chloro-aromatic compounds from anhydrous hydrogen chloride gas.

1 Claim, 1 Drawing Sheet

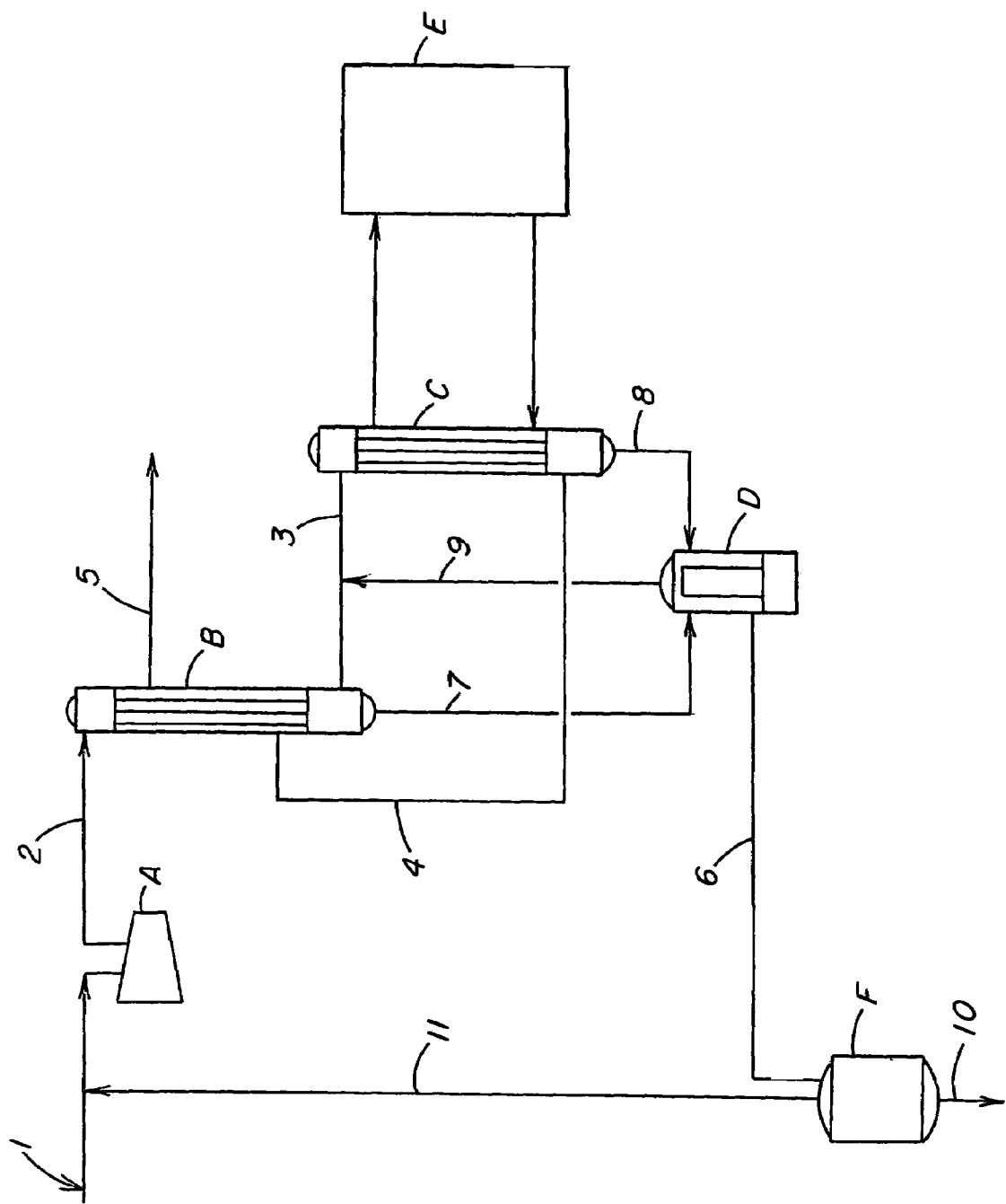

US 7,555,917 B2

PROCESS FOR PURIFICATION OF ANHYDROUS HYDROGEN CHLORIDE GAS

This application is a Divisional of U.S. Ser. No. 10/124,795 filed Apr. 17, 2002 now U.S. Pat. No. 6,719,957.

BACKGROUND OF THE INVENTION

The present invention relates to a process for purifying anhydrous hydrogen chloride gas (aHCl), preferably the anhydrous hydrogen chloride gas recovered from an isocyanate production process and to equipment suitable for use in this process. In the process of the present invention, the content of chlor-aromatics may be reduced from up to 1000 ppm to below 10 ppm levels to make the treated hydrogen chloride gas usable in a catalytic oxychlorination process.

A number of important chemical processes generate anhydrous hydrogen chloride (aHCl) as a byproduct. Examples of such processes include chlorination processes, silane production processes and phosgenation processes. Because large amounts of aHCl can not be disposed of, one of the challenges encountered with each of these processes is purification of the aHCl generated to obtain a usable technical product or raw material for other processes. Several processes for purifying aHCl generated during production processes have been proposed. Thermal treatment of the aHCl at temperatures of up to 800-1600° C. is disclosed in U.S. Pat. No. 5,126,119. Full condensation and distillation under elevated pressure is disclosed in U.S. Pat. No. 4,935,220. However, these processes require high amounts of energy and critical, expensive equipment.

In the commercial phosgenation processes for the production of isocyanates such as TDI (toluene diisocyanate), MDI (diphenylmethane diisocyanates), and HDI (hexamethylene diisocyanate), two moles of aHCl are formed per isocyanate group produced. This large quantity of byproduct must be used in a secondary process.

One such secondary process is the production of muriatic acid. Another alternative is to use the aHCl in a catalytic oxychlorination process with ethylene to produce ethylene dichloride and finally vinyl chloride as the commercial product. This catalytic process is very sensitive to traces of organic compounds, particularly (chloro-) aromatic compounds which can deactivate the catalyst employed.

The most commonly used solvents in isocyanate production are chlorobenzene and dichlorobenzene. (See G. Oertel, *Polyurethane Handbook*, page 66 (Carl Hanser Verlag, Munich (1985)). The aHCl recovered from the phosgenation process is saturated with these chloroaromatics. Deep chilling of the aHCl gas can reduce the chloroaromatics content, but not to the necessary level. Another complicating factor is the high melting point of dichlorobenzene (o-isomer: −17.5° C., p-isomer: +52.8° C.), which limits the usefulness of this approach. More specifically, low pressure phosgenation processes such as those described in G. Oertel, *Polyurethane Handbook*, p. 66 (Carl Hanser Verlag, Munich (1985)) which yield aHCl gas at pressures ranging from atmospheric to below 5 bar overpressure will, even with deep chilling, contain chloroaromatics in a concentration of from several hundred ppm to 1000 ppm.

SUMMARY OF THE INVENTION

It is an object of the present invention to provide a process and equipment useful for removing one or more contaminants from hydrogen chloride gas.

It is also an object of the present invention to provide a process and equipment useful for separating small quantities of high boiling material, e.g., (chloro) aromatic compounds from large volumes of anhydrous HCl gas.

It is another object of the present invention to provide a process for reducing the concentration of contaminants such as (chloro)aromatic compounds in anhydrous HCl gas to <10 ppm.

These and other objects which will be apparent to those skilled in the art are accomplished by compressing anhydrous hydrogen chloride gas containing a (chloro)aromatic compound, cooling the compressed gas to reduce the temperature of the gas to 5-20° C. above the outlet temperature of the process in the second stage but above the freezing point of the highest melting compound in a first cooling stage, further cooling the gas in a second cooling stage to reduce the temperature of the gas to at least −20° C., returning the cooled gas from the second cooling stage to the first cooling stage, and recovering condensate streams which contain (chloro)aromatic compound from the first and second cooling stages.

BRIEF DESCRIPTION OF THE DRAWING

FIG. 1 illustrates an apparatus suitable for carrying out the purification of aHCl in accordance with the present invention.

DETAILED DESCRIPTION OF THE INVENTION

The present invention relates to a process and apparatus suitable for the removal of small quantities of high boiling material (i.e., a material having a boiling point which is at least 100° C. at normal atmospheric pressure) from a large volume of anhydrous HCl gas. The process of the present invention is particularly useful for removing chloroaromatic compounds from anhydrous HCl produced as a byproduct in the amine phosgenation process for producing isocyanates.

In the process of the present invention, an anhydrous HCl gas containing contaminants such as chlorobenzene, o-dichlorobenzene or toluene, is compressed, cooled in a first cooling stage, further cooled in a second cooling stage, returned from the second cooling stage to the first cooling stage, and the condensates from the first and second cooling stages are collected and removed. These collected condensates contain a significant amount of the unwanted high boiling material such as a chloroaromatic. In the compression step of the process of the present invention, the pressure of the gas containing the unwanted high boiling material is increased by at least 7 bar, preferably at least 10 bar, most preferably at least 12 bar. The initial pressure of the hydrogen chloride gas prior to compression is generally in the range of from about 1 to about 6 bar, most preferably from about 1 to about 2 bar. Any compression means known to those skilled in the art may be used to accomplish the desired degree of compression. The optimum amount of compression is dependent upon the initial pressure of the gas and the capability of the processing equipment and may be readily determined by simple preliminary tests. In one particularly preferred embodiment of the invention, the initial pressure of the anhydrous hydrogen chloride gas fed to the compressor is from about 1 to about 5 bar absolute which is increased to from about 8 to about 20 bar absolute.

The compressed gas is then fed to a first cooling stage. In the first cooling stage, the temperature of the compressed gas is reduced to at least 20° C. above the second stage temperature, preferably at least 12° C. above the second stage temperature. The initial temperature of the compressed anhydrous hydrogen chloride gas fed to the first cooling stage may range from 30 to 150° C., preferably from 30 to 60° C. In a preferred embodiment of the present invention, the temperature of the compressed gas fed to the first cooling stage is from 40 to 60° C. and is cooled to a temperature of from 0 to −20° C. As the gas is cooled, a condensate containing unwanted high boiling material (e.g., chloroaromatics) is formed. This condensate is collected and removed from the cooling stage.

The cooled gas is then fed to a subsequent, e.g., second cooling stage in which the temperature of the gas from the first cooling stage is further reduced to at least −20° C., preferably at least −25° C. The initial temperature of the cooled gas fed to the second cooling stage may be from about 0 to about −20° C., preferably from about −5 to about −20° C. In a particularly preferred embodiment of the present invention, the initial temperature of the gas fed to the second cooling stage is from about 0 to about −20° C. and this temperature is reduced to from about −15 to about −30° C. As in the first cooling stage, a condensate forms during the second cooling stage. This condensate is recovered and removed from the second cooling stage.

The cooled gas from the second cooling stage is then fed back to the first cooling stage in which it functions as a refrigerant and contributes to the reduction of the temperature of newly added compressed aHCl which has not previously been cooled.

It is, of course, possible to reduce the temperature of the hydrogen chloride gas to the desired temperature in more than 2 cooling stages, although economic considerations (e.g., equipment cost, processing time, etc.) make use of two cooling stages the most preferred embodiment of the invention. Where more than two cooling stages are employed, the difference between the initial temperature of the hydrogen chloride gas and the desired final temperature of the hydrogen chloride gas is achieved by gradual reduction of the gas temperature in each succeeding cooling stage.

The process of the present invention makes it possible to reduce the concentration of unwanted high boiling byproducts from anhydrous hydrogen chloride gas from levels as high as 10,000 ppm to levels as low as 1 ppm, preferably from 500 ppm to below 10 ppm.

The process of the present invention and apparatus suitable for carrying out this process will be further described with reference to FIG. 1.

In the apparatus illustrated in FIG. 1, the contaminated HCl stream shown as stream 1 enters compressor A and exits as compressed stream 2. Stream 2 then enters heat exchanger B (first cooling stage) to be partially condensed. The condensate is shown as stream 7. The gas leaving heat exchanger B is shown as stream 3. Stream 3 is then fed to heat exchanger C (second cooling stage) where it is further cooled and partially condensed by means of refrigeration equipment E. The condensate stream from heat exchanger C is shown as stream 8. The purified gas leaving heat exchanger C is shown as stream 4. Stream 4 is fed to heat exchanger B where it serves as a refrigerant. Stream 5 leaving heat exchanger B is the purified HCl gas stream obtained by the process of the present invention. The condensate streams 7 and 8 are fed into collector D which is equipped with a heat source and is operated at a pressure equal to that of heat exchanger C. The condensate from collector D is fed as stream 6 to a second collector F which is operated at a pressure lower than that of heat exchangers B and C. Collector F may optionally be equipped with a heat source. Part of the condensate from collector D is re-evaporated and fed, as stream 9 to heat exchanger C. A portion of the condensate from collector F is re-evaporated and fed as stream 11 to stream 1. The remaining portion of the condensate leaves collector F as stream 10 for disposal or rework.

In a preferred embodiment of the present invention, stream 1 is HCl gas containing as contaminant chlorobenzene and/or ortho-dichlorobenzene (technical mixture with approximately 15% para-dichlorobenzene), such as that obtained from isocyanate production processes. This stream which may have a pressure of from about 1 to about 5 bar absolute, has been pre-purified by cooling to 0 to −40° C. and contains from about 100 to about 1000 ppm of contaminants. It must be noted that HCl containing ortho-dichlorobenzene must not be chilled below −15° C. if solidification of the contaminant and subsequent plugging of equipment is to be avoided.

Compressor A can be any kind of equipment capable of increasing the pressure of the hydrogen chloride gas to from about 8 to about 20 bar absolute. Preferred compressors include piston compressors, screw compressors, optionally with oil injection, and centrifugal compressors. The final pressure of the gas must be adjusted so as to overcome the pressure drop of the apparatus and reach the pressure requirements of he subsequent oxychlorination process.

The heat exchangers B and C can be any type of heat exchangers. Preferably, shell and tube exchangers are used. The refrigeration equipment E may be any commercially available equipment capable of cooling the gas stream to a temperature of from about −20 to about −40° C. Suitable refrigerants include ammonia and fluorocarbons having boiling points such that the desired cooling temperatures will be achieved. The heat transfer in exchanger C may be achieved by evaporating this refrigerant immediately or indirectly by chilling an appropriate refrigeration oil with the refrigerant and then cooling the HCl gas with this cooling oil. The collection vessel D is operated at a pressure approximately equal to the pressure of heat exchanger C. A portion of the condensate is evaporated and fed (shown as stream 9 in FIG. 1) to heat exchanger C. The collection vessel F may be operated at any pressure below the compression pressure of stream 2 and equal to or above the pressure of the feed gas stream 1. Due to the pressure drop, a certain volume of condensate is evaporated again. This evaporation can be increased by adding heating capacity to collection vessel F. Therefore, vessel F may be a flash tank with heated walls or a built in heat exchanger bundle. Given the low temperature of the condensate stream 6, a waste heat stream close to ambient temperature (i.e. 0-30° C.) may be employed favorably.

The waste stream 10 is composed primarily of the contaminants which were to be removed. In the preferred embodiment of the invention, this waste stream contains varying amounts of HCl, usually from <1 to 50% by weight, depending on the operation of the flash step in vessel D. Provided the remaining HCl content is low, this stream may be directly disposed of by incineration, or it may be neutralized (e.g., with caustic soda) and then disposed of or it may be reused in a different process. For example, condensate streams having larger HCl contents may be used to produce muriatic acid.

One of the advantages of the process of the present invention is its flexibility with the respect to concentration of contaminants in the inlet stream. Because the temperature in the second stage and/or final stage directly affects the amount of contaminant present in the hydrogen chloride gas, the concentration of contaminants in the outlet stream can be easily controlled by controlling the cooling temperature in that second and/or final cooling stage. The lower the temperature in the second and/or final cooling stage (i.e., exchanger C in the apparatus illustrated in FIG. 1 (second stage)), the lower the contamination level in the HCl gas. Surprisingly low contaminant concentrations, well below a goal of 10 ppm, may be achieved. An additional advantage of the process of the present invention is that in spite of the high melting points of some of the contaminants to be removed, no solids formation is observed.

Further, due to the two-stage operation with energy integration, the process is very energy efficient, especially when compared to the option of fully condensing and distilling the anhydrous HCl.

The process of the present invention is preferably applied to HCl gas recovered from isocyanate production process, but it can be adapted to other industrial process that generate contaminated HCl gas as byproduct. Such adaptation would involve minor adjustments in temperature and pressure processing parameters to obtain the optimum treatment conditions. Selection of the appropriate temperatures and pressures would, however, be well within the skill of those in the art.

The following examples are given to illustrate the present invention. All parts and percentages given are parts by volume or percentages by volume, unless otherwise indicated.

EXAMPLES

The vapor/liquid equilibria data in the Examples which follow were generated in a pilot unit corresponding in construction to that illustrated in FIG. 1. In the pilot unit, a portion of the HCl gas generated during the isocyanate production process was compressed and purified in accordance with the present invention in two refrigerated cooling stages.

Example 1

The apparatus illustrated in FIG. 1 was used as the pilot unit. The HCl offgas from an isocyanate unit was fed into compressor A at a rate of 1000 kg/hr. under the conditions indicated in Table 1 at various concentrations of monochlorobenzene impurity. The stream numbers indicated in the Table correspond to those shown in FIG. 1. The processing conditions and the concentrations of impurity before and after treatment in accordance with the process of the present invention are reported in Table 1 below.

TABLE 1

| Feed Conc.[1] | Out Temp. Stream $2^2$ (° C.) | Pressure Stream $2^3$ (bar) | Out Temp. Streams $3/7^4$ (° C.) | Out Temp. Stream $5^5$ (° C.) | Prod. Conc. Stream $5^6$ (ppm vol.) | Out Temp. Streams $4/8^7$ (° C.) |
|---|---|---|---|---|---|---|
| 0.01 | 40 | 13 | −7 | 37 | 0 | −24 |
| 0.001 | 40 | 13 | −16 | 37 | 0 | −24 |
| 0.0001 | 40 | 13 | −19 | 37 | 0 | −24 |
| 0.0001 | 40 | 8 | −33 | 37 | 0 | −39 |
| 0.001 | 40 | 8 | −30 | 37 | 0 | −39 |
| 0.01 | 40 | 8 | −20 | 37 | 1 | −38 |
| 0.01 | 40 | 20 | 5 | 37 | 1 | −8.9 |
| 0.001 | 40 | 20 | −2 | 37 | 0 | −9.0 |
| 0.0001 | 40 | 20 | −5 | 37 | 0 | −9.1 |

[1]Feed concentration of monochlorobenzene (volume fraction)
[2]Outlet Temperature from compression (° C.) for stream 2
[3]Pressure (bar) for stream 2
[4]Outlet Temperature (° C.) for streams 3 and 7
[5]Outlet Temperature (° C.) for stream 5
[6]Product concentration (ppm volume) in stream 5
[7]Outlet Temperature (° C.) for streams 4 and 8

Example 2

The procedure of Example 1 was repeated using as the HCl offgas, a gas containing both monochlorobenzene and ortho-dichlorobenzene. The concentrations of the impurities present initially and after treatment in accordance with the process of the present invention and the processing conditions are given in Table. 2 below.

TABLE 2

| Feed Conc.[1] | Feed Conc.[8] | Out Temp. Stream $2^2$ (° C.) | Pressure Stream $2^3$ (bar) | Out Temp. Streams $3/7^4$ (° C.) | Out Temp. Stream $5^5$ (bar) | Prod. Conc. Stream $5^6$ (ppm vol) | Out Temp. Streams $4/8^7$ (° C.) |
|---|---|---|---|---|---|---|---|
| 0.005 | 0.005 | 40 | 13 | −8 | 37 | 0.14 | −24 |
| 0.0005 | 0.0005 | 40 | 13 | −14 | 33 | 0.07 | −24 |
| 0.00005 | 0.00005 | 40 | 13 | −14 | 31 | 0.071 | −24 |
| 0.00005 | 0.00005 | 40 | 8 | −14 | 16 | 0.059 | −38 |
| 0.0005 | 0.0005 | 40 | 8 | −14 | 17 | 0.068 | −38 |
| 0.005 | 0.005 | 40 | 8 | −14 | 25 | 0.69 | −38 |
| 0.005 | 0.005 | 40 | 20 | 5 | 37 | 0.61 | −9 |
| 0.0005 | 0.0005 | 40 | 20 | −3 | 37 | 0.021 | −9 |
| 5.00 | 5.00 | 40 | 20 | −5 | 37 | 0.0012 | −9 |

[1-7]Same meaning as in Table 1.
[8]Feed concentration of ortho-dichlorobenzene (volume fraction)

Although the invention has been described in detail in the foregoing for the purpose of illustration, it is to be understood that such detail is solely for that purpose and that variations can be made therein by those skilled in the art without departing from the spirit and scope of the invention, except as it may be limited by the claims.

What is claimed is:

1. An apparatus useful for removing a contaminant from a hydrogen chloride gas containing the contaminant comprising:
   a) a compression means for increasing pressure of the gas to be treated,
   first cooling device to which the compressed gas is fed to reduce the temperature of the compressed gas to a temperature at least 20° C. above that of a second cooling stage,
   c) a second cooling device to which the cooled gas from the first cooling device is fed to further reduce the temperature of the cooled hydrogen chloride gas,
   d) means for evaporating at least a portion of the condensate generated from the first and second cooling devices and returning vapors generated to a point between the first and the second cooling device, and
   e) means for removing at least a portion of the condensate generated in the first and in the second cooling devices.

* * * * *